US009796606B2

(12) United States Patent
Zhang et al.

(10) Patent No.: US 9,796,606 B2
(45) Date of Patent: Oct. 24, 2017

(54) METHOD FOR INDUCING CONTINUOUS SEPARATION OF COPPER IONS FROM COPPER USING UV-LIGHT SOURCE

(71) Applicant: SHENZHEN KITEWAY AUTOMATION ENGINEERING CO., LTD., Shenzhen, Guangdong (CN)

(72) Inventors: Lianfeng Zhang, Guangdong (CN); Jinsong Zhang, Guangdong (CN); Ruyi Wan, Guangdong (CN); Kaining Huang, Guangdong (CN); Ye Peng, Guangdong (CN)

(73) Assignee: SHENZHEN KITEWAY AUTOMATION ENGINEERING CO., LTD., Shenzhen (CN)

( * ) Notice: Subject to any disclaimer, the term of this patent is extended or adjusted under 35 U.S.C. 154(b) by 0 days.

(21) Appl. No.: 15/365,975

(22) Filed: Dec. 1, 2016

(65) Prior Publication Data

US 2017/0081213 A1 Mar. 23, 2017

Related U.S. Application Data

(63) Continuation of application No. PCT/CN2014/086387, filed on Sep. 12, 2014.

(30) Foreign Application Priority Data

Jun. 27, 2014 (CN) .......................... 2014 1 0301650

(51) Int. Cl.

| | |
|---|---|
| ***C02F 1/32*** | (2006.01) |
| ***C02F 1/50*** | (2006.01) |
| *C02F 103/02* | (2006.01) |
| *C02F 103/42* | (2006.01) |

(52) U.S. Cl.

CPC ................ *C02F 1/325* (2013.01); *C02F 1/32* (2013.01); *C02F 1/50* (2013.01); *C02F 1/505* (2013.01); *C02F 2103/023* (2013.01); *C02F 2103/42* (2013.01); *C02F 2201/3221* (2013.01); *C02F 2201/3225* (2013.01); *C02F 2303/04* (2013.01)

(58) Field of Classification Search

CPC .. C02F 1/325; C02F 1/505; C02F 2201/3221; C02F 2303/04; C02F 2201/3225; C02F 1/32; C02F 1/50

See application file for complete search history.

(56) References Cited

FOREIGN PATENT DOCUMENTS

| | | |
|---|---|---|
| CN | 1321612 A | 11/2001 |
| CN | 101883738 A | 11/2010 |

OTHER PUBLICATIONS

International Search Report of PCT Patent Application No. PCT/CN2014/086387 dated Mar. 24, 2015.

*Primary Examiner* — Walter D Griffin
*Assistant Examiner* — Cameron Allen

(57) ABSTRACT

A method for inducing continuous separation of copper ions from copper using UV-light source, comprising the following steps: (1) cutting apiece of copper into wires or slices for immersing into a vessel containing water; switching on a stirrer for stirring the water continuously and keeping the copper being immersed in the water; (2) turning on the UV-light source for irradiating the copper and the water continuously; appearing a large amount of white precipitate in the water; (3) filtering the solution; detecting the filtered solution, a certain concentration copper ions in the filtered solution are found; adding hydrochloric acid by drops into the unfiltered original solution, the white precipitate is dissolved and copper ions are detected. The invention makes the copper separate out copper ions continuously and can be applied to copper ion disinfection for swimming-pool water, scenic water and cooling water, etc.

8 Claims, No Drawings

METHOD FOR INDUCING CONTINUOUS SEPARATION OF COPPER IONS FROM COPPER USING UV-LIGHT SOURCE

CROSS REFERENCE TO RELATED APPLICATIONS

The present application is a Continuation Application of PCT application No. PCT/CN2014/086387 filed on Sep. 12, 2014, which claims the benefits of Chinese Patent Application No. 201410301650.X filed on Jun. 27, 2014, the contents of which are hereby incorporated by reference.

TECHNICAL FIELD

The invention relates to a method for inducing continuous separation of copper ions from copper using UV-light source, belonging to the technology field of UV photolysis of copper.

BACKGROUND ART

The swimming-pool water, scenic water and cooling water often need disinfection and normally it is disinfected by copper ions. In the existing copper ion generator for disinfection, the copper ions are separated out by electrolysis, which is conducted by inserting the negative and positive poles into an electrolytic solution, exerting voltage and controlling the current. The electrolysis technology has a few shortcomings, for example, the surface of the electrode may be passivated; new solution may be added in necessity; more pollutants may be generated. Another common method for water disinfection is UV light irradiation. The UV light in different wave lengths has different disinfection effects. For example, the UV light with a wave length of 185 nm is mainly to convert oxygen in the air to ozone for disinfection and the UV light with a wave length of 254 nm is mainly to change the DNA structure of the bacteria and prevent it from growing and reproducing. In the process of ultraviolet disinfection, people shall keep away from the field of disinfection. It has low economic performance as the disinfection time is very long.

After long term of research, the inventor has found that, the copper may continuously generate cooper ions of high concentration upon continuous irradiation by UV-light. Therefore, it is a disinfection method with high practicability and wide applicability. Moreover, the technology of UV photolysis of copper has never been reported in exiting patents.

SUMMARY OF THE INVENTION

The invention is to provide a method for inducing continuous separation of copper ions from copper using UV-light source. This simple and effective method can continuously generate copper ions and can be widely used.

The invention is achieved through the following technical schemes:

A method for inducing continuous separation of copper ions from copper using UV-light source, including the following steps:

(1) cutting a copper into wires or slices for immersing into a vessel containing water; switching on a stirrer for stirring the water continuously and keeping the copper being immersed in the water;

(2) turning on the UV-light source for irradiating the water continuously until a large amount of white precipitate appears in the water;

(3) filtering the water solution; detecting the filtered solution, a certain concentration copper ions in the filtered solution are found; and adding hydrochloric acid by drops into unfiltered original solution, the white precipitate is dissolved and copper ions are detected.

In the Step (1), the water has an electric conductivity of 100-500 μs/cm.

In the Step (1), the copper is immersed into the water with a distance from the water surface of 10-30 mm.

In the Step (2), the wave length of the UV-light source is either 185 nm or 254 nm or both. In the Step (2), the UV-light source is installed outside the water or immersed in the water. In the Step (2), the UV-light source is installed outside the water with a distance from the water surface of 10-20 mm.

In the Step (2), the UV-light source is immersed in the water; the UV-light source is put into a quartz tube with one end sealed.

In the Step (2), the time for UV-light source irradiating the water is at least 18 h.

The mechanism of copper ions being separated out from the copper into water in the invention is as follows:

1. The copper surface has an oxide layer; as the copper surface is attacked by photons, the electrons in the oxide layer will jump among the energy bands and enter into the conductive band from the valance band. Because the outside of the oxidation layer is water, the photons will change the potential energy of the electronic open circuit on the metal surface and form negative photovoltage. Then, the electrons will flow to the copper and the copper ions will be separated out.

2. The copper has slight flaws on the surface. These slight flaws will form a small galvanic cell with the copper, thus, the copper surface will be corroded and oxidized to generate out copper ions. Photons will accelerate the above process.

3. On the irradiated surface, the copper surface will be changed due to the above two photochemical reactions, resulting in different electrochemical properties between the irradiated surface and the non-irradiated surface, i.e., the electrode potential of the irradiated surface rises. The electrons will flow to the irradiated surface from the non-irradiated surface and the copper ions will be separated out from the non-irradiated surface.

The beneficial effect of the invention is that: the invention is a new technology of UV photolysis of copper, simple and effective; meanwhile, the copper ions will be separated out continuously with high concentration. With wide application, the method can be used in many disinfection fields, especially in the field of water disinfection.

DETAILED DESCRIPTION OF THE PREFERRED EMBODIMENTS

The invention is further described in combination with following embodiments.

Embodiment 1

Evenly distribute the copper wires with a diameter of 0.4 mm and a total irradiated area of about 10 $cm^2$ into a vessel with a diameter of 90 cm and immerse the copper wires into the water of 1 cm. Use two UV lamps of 8 watt with a wave length of 254 nm to irradiate at a distance of 1 cm away from the water surface (the nearest place of the lamps to the water surface) for 18 h. Then, a large amount of white copper hydroxide precipitate appears in the water; the concentration of the copper ions in the filtered solution is 0.96 mg/L after filtration; drop two drops of hydrochloric acid into the unfiltered original solution; the white precipitate is dissolved and the concentration of the copper ions is 24.98 mg/L.

Embodiment 2

Immerse a UV lamp of 8 watt and apiece of copper into a vessel with 20 L of water; the copper is cut into slices and the UV lamp is with a wave length of 185 nm. The UV lamp is put into a quartz tube with one end sealed and the quartz tube is placed into water. Circulate the water with a pump to make sure that the copper ions generated on the copper surface will not accumulate to form copper hydroxide. Four days later, copper ions of 0.25 ppm are detected in the water.

From the above embodiments, it can be seen that copper ions may be continuously separated out from the copper while being irradiated by UV-light no matter for 18 h or 4 days.

The above displays and describes the basic principle, main features and advantages of the invention. A person skilled in the art shall understand that the invention is not limited to the above embodiments. The above embodiments and the description in the specification only explain the principle of the invention. Under the premise of not departing from the spirit and scope of the invention, any changes and improvements of the invention shall fall within the protection scope of the invention. The protective scope of the invention is defined by the attached claims and the equivalents.

What is claimed is:

1. A method for inducing continuous separation of copper ions from copper using UV-light source, comprising the steps of:

(1) cutting a copper into wires or slices, immersing into a vessel containing water, switching on a stirrer, stirring the water continuously and keeping the copper being immersed in the water;

(2) turning on the UV-light source, irradiating the copper and the water continuously until white precipitate appears in the water; and (3) filtering part of original solution with the white precipitate formed in the step (2) to form a filtered solution and adding hydrochloric acid by drops into the other part of original solution formed in the step (2) to form a reaction solution; sampling and analyzing the copper concentration in the filtered solution and the reaction solution with a analytic instrument, respectively, and finding that both the filtered solution and the reaction solution have copper ions.

2. The method for inducing continuous separation of copper ions from copper using UV-light source according to claim 1, wherein, in the Step (1), the water has an electric conductivity of 100-500 μs/cm.

3. The method for inducing continuous separation of copper ions from copper using UV-light source according to claim 1, wherein, in the Step (1), the copper is immersed into the water with a distance from the water surface of 10-30 mm.

4. The method for inducing continuous separation of copper ions from copper using UV-light source according to claim 1, wherein, in the Step (2), the wave length of the UV-light source is either 185 nm or 254 nm or both.

5. The method for inducing continuous separation of copper ions from copper using UV-light source according to claim 1, wherein, in the Step (2), the UV-light source is installed outside the water or immersed in the water.

6. The method for inducing continuous separation of copper ions from copper using UV-light source according to claim 5, wherein, in the Step (2), the UV-light source is installed outside the water with a distance from the water surface of 10-20 mm.

7. The method for inducing continuous separation of copper ions from copper using UV-light source according to claim 5, wherein, in the Step (2), the UV-light source is immersed in the water; and the UV-light source is put into a quartz tube with one end sealed.

8. The method for inducing continuous separation of copper ions from copper using UV-light source according to claim 1, wherein, in the Step (2), the time for UV-light source irradiating the water is at least 18 h.

* * * * *